US008621201B2

(12) United States Patent
Costa et al.

(10) Patent No.: US 8,621,201 B2
(45) Date of Patent: Dec. 31, 2013

(54) SHORT AUTHENTICATION PROCEDURE IN WIRELESS DATA COMMUNICATIONS NETWORKS

(75) Inventors: Luciana Costa, Turin (IT); Giorgio Freguglia, Turin (IT); Federico Frosali, Turin (IT); Romano Fantacci, Pistoia (IT); Leonardo Maccari, Florence (IT); Tommaso Pecorella, Florence (IT)

(73) Assignee: Telecom Italia S.p.A., Milan (IT)

( * ) Notice: Subject to any disclaimer, the term of this patent is extended or adjusted under 35 U.S.C. 154(b) by 1322 days.

(21) Appl. No.: 11/922,781

(22) PCT Filed: Jun. 29, 2005

(86) PCT No.: PCT/EP2005/006977
§ 371 (c)(1),
(2), (4) Date: Feb. 20, 2009

(87) PCT Pub. No.: WO2007/000179
PCT Pub. Date: Jan. 4, 2007

(65) Prior Publication Data
US 2009/0217033 A1    Aug. 27, 2009

(51) Int. Cl.
*H04M 1/68* (2006.01)
(52) U.S. Cl.
USPC ........... 713/155; 713/168; 713/150; 380/270; 455/410
(58) Field of Classification Search
USPC ....................................................... 713/202
See application file for complete search history.

(56) References Cited

U.S. PATENT DOCUMENTS 5,924,040 A * 7/1999 Trompower ............... 455/456.2
(Continued)

OTHER PUBLICATIONS

Mishra et al., "Proactive Key Distribution to Support Fast and Secure Roaming"; IEEE802-11-03/084r0-1, pp. 1-21, (2003).

"Part 11: Wireless LAN Medium Access Control (MAC) and Physical Layer (PHY) Specifications, Amendment 6: Medium Access Control (MAC) Security Enhancements"; IEEE Standard for Information Technology-Telecommunications and Information Exchange Between Systems-Local and Metropolitan Area Networks-Specific Requirements; IEEE Computer Society, pp. i-xiv, and 1-175, (2004).

(Continued)

*Primary Examiner* — Andrew Goldberg
(74) *Attorney, Agent, or Firm* — Finnegan, Henderson, Farabow, Garrett & Dunner, L.L.P.

(57) ABSTRACT

In a wireless communications network including at least one authenticator and at least one authentication server, wherein the authenticator is adapted to interact with the authentication server for authenticating supplicants in order to conditionally grant thereto access to the wireless communications network, a short authentication method for authenticating a supplicant, the method including: providing a shared secret, shared by and available at the supplicant and the authentication server; having the supplicant provide to the authenticator an authentication token, wherein the authentication token is based on the shared secret available thereat; having the authenticator forward the authentication token to the authentication server; having the authentication server ascertain an authenticity of the received authentication token based on the shared secret available thereat; in case the authenticity of the authentication token is ascertained, having the authentication server generate a first authentication key based on the shared secret available thereat, and provide the generated authentication key to the authenticator; having the supplicant generate a second authentication key based on the shared secret; and having the supplicant and the authenticator exploit the generated first and the second keys for communicating with each other. The short authentication method is particularly useful in situations of handoff of the supplicant from an authenticator to another.

19 Claims, 8 Drawing Sheets

(56) References Cited

U.S. PATENT DOCUMENTS

| | | | |
|---|---|---|---|
| 6,253,325 B1* | 6/2001 | Steele et al. | 726/5 |
| 6,826,686 B1* | 11/2004 | Peyravian et al. | 713/168 |
| 2002/0053035 A1* | 5/2002 | Schutzer | 713/202 |
| 2002/0166048 A1* | 11/2002 | Coulier | 713/169 |
| 2002/0197979 A1* | 12/2002 | Vanderveen | 455/410 |
| 2003/0219127 A1* | 11/2003 | Russ et al. | 380/239 |
| 2004/0103275 A1 | 5/2004 | Ji et al. | |
| 2004/0240412 A1 | 12/2004 | Winget | |
| 2006/0087999 A1* | 4/2006 | Gustave et al. | 370/328 |
| 2006/0235796 A1* | 10/2006 | Johnson et al. | 705/44 |
| 2007/0022473 A1* | 1/2007 | Hird | 726/9 |

OTHER PUBLICATIONS

Aboba et al., "Extensible Authentication Protocol (EAP)", The Internet Society, Network Working Group Request for Comments: 3748, pp. 1-67, (2004).

Stanley et al., "Extensible Authentication Protocol (EAP) Method Requirements for Wireless LANs", The Internet Society, Network Working Group Request for Comments: 4017, pp. 1-11, (2005).

Aboba et al.. "EAP Key Management Framework", The Internet Society, EAP Working Group Internet-Draft, pp. 1-55, (2004).

* cited by examiner

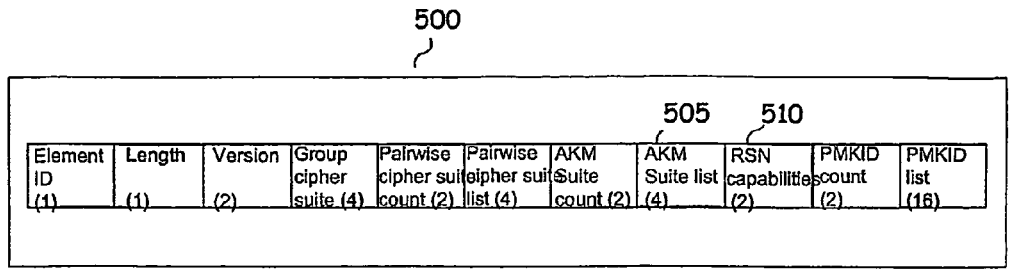
FIG. 5
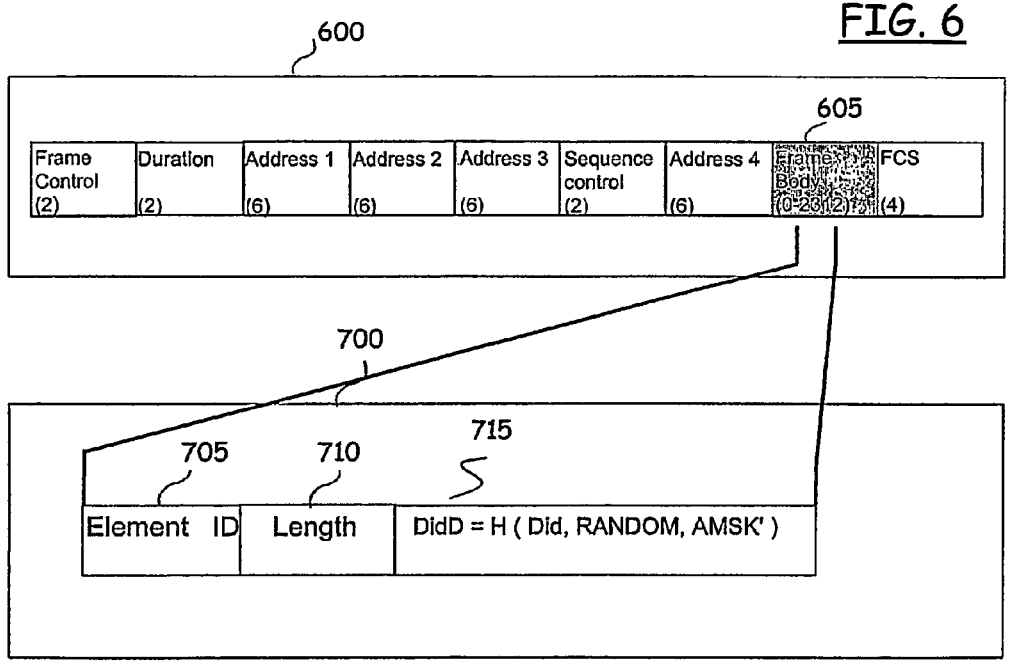
FIG. 6
FIG. 7
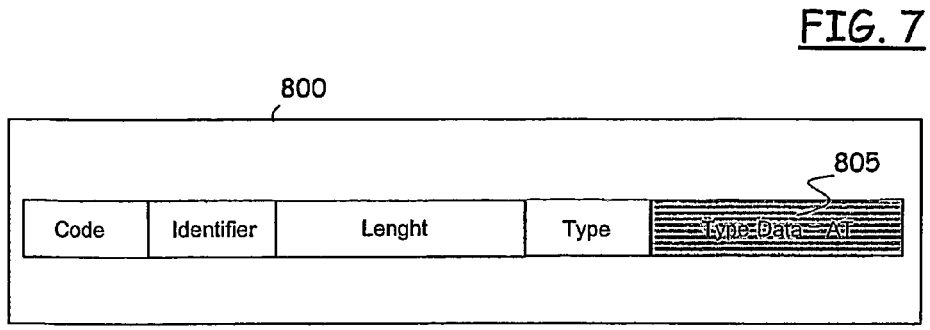
FIG. 8

SHORT AUTHENTICATION PROCEDURE IN WIRELESS DATA COMMUNICATIONS NETWORKS

CROSS REFERENCE TO RELATED APPLICATION

This application is a national phase application based on PCT/EP2005/006977, filed Jun. 29, 2005, the content of which is incorporated herein by reference.

According to an aspect of the present invention, a short authentication method is provided, for authenticating a supplicant in a wireless communications network including at least one authenticator and at least one authentication server, wherein the authenticator is adapted to interact with the authentication server for authenticating supplicants in order to conditionally grant thereto access to the wireless communications network. The method comprises:

provides a shared secret, shared by and available at the supplicant and the authentication server;
having the supplicant provide to the authenticator an authentication token, wherein said authentication token is based on said shared secret available thereat;
having the authenticator forward the authentication token to the authentication server;
having the authentication server ascertain an authenticity of the received authentication token based on said shared secret available thereat;
in case the authenticity of the authentication token is ascertained, having the authentication server generate a first authentication key based on said shared secret available thereat, and provide the generated authentication key to the authenticator;
having the supplicant generate a second authentication key based on said shared secret; and
having the supplicant and the authenticator exploit the generated first and second keys for communicating with each other.

FIELD OF THE INVENTION

The present invention generally relates to the field of telecommunications, particularly to data communications networks and, even more particularly, to wireless data communications networks, like those complying with the standard IEEE (Institute of Electrical and Electronics Engineers) 802.11. More specifically, the invention concerns a fast and secure authentication mechanism of wireless terminals in wireless data communications networks.

BACKGROUND OF THE INVENTION

Advantages in terms of ease of installation and use of wireless connections, low cost of hardware equipment, good performances in terms of maximum bit-rate comparable to that of wired data communications networks have favored, over the last years, a wide spread of Wireless Local Area Networks (Wireless LANs or WLANs).

Most WLAN deployments comply with the IEEE 802.11 standard, commonly called "Wi-Fi", a short term for "Wireless Fidelity". The IEEE 802.11 standard, available on the Internet for download via the URL: http://standards.ieee.org/getieee802/802.11.html (at the filing date of the present patent application), specifies the Medium Access Control (MAC) and physical (PHY) layers for devices capable of operation in the unlicensed Industrial, Scientific, and Medical (ISM) radio bands (2.4 GHz and 5 GHz).

WLANs are however inherently less secure than conventional wired LANs, for the reason that they use radio as communication medium. In a wireless network it is hard to control the exact extension range of the network; in the case of a company's WLAN, for example, the radio signal can easily get over the boundary of the company site and an attacker, with a suitable antenna, can passively monitor ("sniff", in jargon) network traffic without the need to access neither physically nor logically the network.

To increase the network security, the IEEE 802.11 standardization group has defined an amendment to the original IEEE 802.11 standard, called IEEE 802.11i and commercially known as Wi-Fi Protected Access (WPA), which establishes a new security standard for Wi-Fi networks.

As known in the art, the IEEE 802.11i standard relies on a port-based network access-control mechanism established in another, independent standard called IEEE 802.1X (IEEE standard for local and metropolitan area networks—port-based network exchange) for authentication and key distribution.

The IEEE 802.1X relies on the Extensible Authentication Protocol (EAP—specified in the Request For Comment 3748, downloadable at www.ietf.org/rfc/rfc3748.txt at the filing date of the present patent application), an Internet Engineering Task Force (IETF) standard that defines a general-purpose authentication protocol built around a "challenge-response" communication paradigm, to support a wide variety of authentication mechanisms (called "EAP-types"). Moreover, the IEEE 802.1X includes a procedure for dynamic derivation of keys, on a per client and per session basis, embedded in the authentication method.

Summarizing, the IEEE 802.11i standard establishes that, after performing the IEEE 802.1X authentication procedure, a key-agreement sequence based on messages of the type EAP Over LAN (EAPOL)-key takes place according to which, by means of a four-way handshake, a session encryption key can be derived starting from a Master Session Key (MSK).

Without any pretence to completeness (being concepts per se known in the art), the "actors" of the IEEE 802.1X framework are the "supplicant", the "authenticator" and the "authentication server".

The supplicant is an entity, e.g. a wireless user terminal that seeks to be authenticated by an authenticator, e.g., an Access Point (AP) of the wireless network. The supplicant, wishing to use a service (MAC connectivity) offered via a port on the authenticator, needs to be authenticated via the authenticator to a central authentication server, which directs the authenticator about how to provide the service after successful authentication.

The authenticator has two ports of access to the network: an "uncontrolled" port, always open to the authentication message transit, and a "controlled" port that is only open if the authentication procedure succeeds. At the end of the authentication procedure, the authenticator receives from the authentication server the coding keys, per client and per session, for the next data radio communications with the supplicant.

The authentication server is an entity that provides an authentication service to one or more authenticators; it can be for example a RADIUS (Remote Authentication Dial-In User Service) server, a Kerberos server, a Diameter server etc.

The implementation of the IEEE 802.11i standard has an impact on the management of the mobility of the wireless terminals, and particularly of the handoff procedures, i.e. those procedures managing the change of the point of access to the wireless network (change of access point) by a moving wireless terminal. Essentially, differently from the IEEE 802.11 standard, in the IEEE 802.11i standard the authentication sequence takes place after the association procedure, and this has a strong impact on the time required for the handoff.

According to the IEEE 802.11 standard, an authentication procedure towards the new access point is first performed, followed by an association procedure with the new access point, and, consequently, the de-association from the old access point.

The adoption of the IEEE 802.11i standard has the consequence that, the 802.1X authentication procedure is performed after the open authentication and association procedure. Due to this, the computational burden inherent to the 802.1X authentication mechanism is entirely within the handoff, and this prevents from speeding up the handoff procedure while retaining a strong (i.e., computationally-intensive) authentication method; in other words, as long as the authentication method is kept strong, so as to ensure a high level of security, it is inherently computationally-intensive, and the handoff procedure thus takes a relatively long time.

The problem of reducing the time necessary to manage the handoff has already been addressed.

For example, the standardization group IEEE 802.11f ("Recommended Practice for Multi-Vendor Access Point Interoperability via an Inter-Access Point Protocol Across Distribution Systems Supporting IEEE 802.11 Operation") has proposed a solution exploiting the Inter-AP communication protocol (IAPP), whose aim is to maintain a secure association in respect of each wireless terminal, and let such an information be exchanged in a secure way by APs involved in a handoff.

A different approach, based on a proactive key distribution, is proposed in the submission by A. Mishra et al. "Proactive Key Distribution to support Fast Handoff and secure roaming", available at http://www.drizzle.com/~aboba/IEEE/ (at the filing date of the present application): once the mobile terminal completes an initial full authentication, the AAA server determines the neighbors of the associated AP and notifies them that a specific mobile terminal may roam into the coverage area of the neighboring APs. An AP may then decide to request the security association from the AAA server.

US 2004/0240412 describes a method for pre-authenticating a pre-establishing key management on a roaming device prior to re-association to facilitate fast handoff.

In the context of Secure Nomadic Wireless Networks (SNOWNET), US 2004/0103275 discloses a solution in which the handoff of a wireless terminal is managed through a public-key mechanism.

SUMMARY OF THE INVENTION

The Applicant has observed that, up to now, the solutions proposed in the art for speeding up the management of the handoff are not satisfactory.

For example, in connection with the solution proposed by the IEEE 802.11f standardization group, the Applicant observes that in case an AP is compromised, the current and next IEEE 802.11i PTK's (Pairwise Transient Keys) are no more secure. Moreover, for the Perfect Forward Secrecy (PFS) it would be necessary that the PMK (Pairwise Master Key) used for the handoff be calculated starting from a secret unknown and inaccessible to the AP. Furthermore, the solution involves in any case a significant delay in the handoff, caused by the LAPP communication between the two involved APs and the RADIUS server.

Concerning the approach suggested by Mishra et al., the Applicant observes that the APs need to maintain a security association, albeit possibly for a limited time, and this may cause a waste of resources, especially in those cases where the wireless terminal do not perform the handoff within that time, or in case the handoff is performed but after defined lifetime, with the consequence that the wireless terminal will have to perform a full authentication.

In respect of the method of US 2004/0240412, the Applicant observes that each AP has to store the PMKs of the wireless terminals, irrespective of whether the terminals perform the handoff or not; due to this, should an AP be compromised in consequence of an attack it would allow the attacker to gain knowledge of the PMKS relating to other wireless terminals and, by simply sniffing the packets of the four-ways handshake, the attacker could derive the session keys PTKs.

Concerning US 2004/0103275, the Applicant observes that the temporary communication session key received by the mobile terminal during the re-authentication is only valid for a short period of time, after that, the mobile terminal must complete the normal mobile terminal authentication procedure through the RADIUS server. Also, the wireless network uses a shared secret key known to all authentication portable wireless network node devices to encrypt data transmitted through the wireless backbone network. Due to that, in case a wireless network node device is compromised an attacker could be able to intercept all traffic transmitted in the wireless backbone.

The Applicant has observed that a compromised access point should not put at risk the secrecy of the preceding and following security associations, and thus the respective authentication keys; and only the authentication server and the access point to which a wireless terminal is connected at a given time should be assumed to be "trusted" entities, whereas all the other access points should not be assumed to be trusted.

The Applicant has further observed that a faster handoff procedure can be achieved if the execution of a full authentication procedure is not involved (wherein by "full" there is meant the authentication procedure that shall take place at the first time a wireless terminal connects to the wireless network, during which all keys used for security purpose, such as encryption, are generated afresh in both the wireless terminal and the authentication server).

Based on these pre-requisite, the Applicant has devised a new, efficient and secure short authentication procedure useful for managing the handoffs. The Applicant has found that this procedure can also be applied to the full authentication procedure. In particular, the short authentication procedure according to the present invention comprises the generation of an authentication token based on a shared secret, shared by and available at the wireless terminal and the authentication server.

According to an aspect of the present invention, a short authentication method as set forth in appended claim 1 is provided, for authenticating a supplicant in a wireless communications network including at least one authenticator and at least one authentication server, wherein the authenticator is adapted to interact with the authentication server for authenticating supplicants in order to conditionally grant thereto access to the wireless communications network. The method comprising:

providing a shared secret, shared by and available at the supplicant and the authentication server;

having the supplicant provide to the authenticator an authentication token, wherein said authentication token is based on said shared secret available thereat;

having the authenticator forward the authentication token to the authentication server;

having the authentication server ascertain an authenticity of the received authentication token based on said shared secret available thereat;

in case the authenticity of the authentication token is ascertained, having the authentication server generate a first authentication key based on said shared secret available thereat, and provide the generated authentication key to the authenticator;

having the supplicant generate a second authentication key based on said shared secret; and having the supplicant and the authenticator exploit the generated first and second keys for communicating with each other.

For the purposes of the present invention, by "authenticator" there is intended any wireless network device performing (possibly inter-alia) the function to enforce authentication to a requesting "supplicant", before allowing access to services that are accessible through it, as defined by the 802.1X standard. By "wireless device" there is intended any devices equipped with a wireless communications interface. By "supplicant" there is intended any wireless device, like a wireless user terminal, that plays the supplicant role as defined by the 802.1X standard. By "authentication server" there is meant a network entity adapted to provide an authentication service to the authenticator, wherein such an authentication service authorizes or not the access to the network by the wireless device based on credentials provided by the latter. By "handoff" there is finally meant any situation in which a wireless device changes the authenticator.

It is pointed out that depending on the specific type of wireless communications network, the roles of the various entities, particularly that of authenticator and supplicant may be played by different devices, and one same device may play more than one role. For example, in the case of a traditional Wi-Fi network, with access points hardwired to an infrastructured network, the network's access points play the role of authenticators in respect of supplicants that are represented by wireless user terminals associated therewith. In the case of a mesh network, for example compliant to the IEEE 802.11 standard, a generic access point plays the role of supplicant and of authenticator in respect of other access points of the backhaul network or in respect of supplicants represented by wireless terminals associated therewith. In the further case of a Mobile Ad-hoc NETwork (MANET), the generic wireless user terminal, in addition to playing the role of supplicant, also plays the role of authenticator in respect of other wireless user terminals.

Another aspect of the present invention concerns a wireless communications network including:

at least one authentication server;

at least one authenticator;

at least one supplicant, wherein the authenticator is adapted to interact with the authentication server for authenticating the supplicant in order to conditionally grant thereto access to the wireless communications network;

a shared secret, shared by and available at the supplicant and the authentication server;

wherein:

the supplicant is adapted to provide to the authenticator an authentication token based on said shared secret;

the authenticator is adapted to forward the authentication token to the authentication server;

the authentication server is adapted to ascertain an authenticity of the received authentication token based on said shared secret available thereat and, in case the authenticity of the authentication token is ascertained, to generate a first authentication key based on said shared secret available thereat, and to provide the generated authentication key to the authenticator;

and wherein:

the supplicant is further adapted to generate a second authentication key based on said shared secret, the authenticator and the supplicant are adapted to exploit the generated first and the second for communicating with each other.

BRIEF DESCRIPTION OF THE DRAWINGS

The features and advantages of the present invention will be made apparent by the following detailed description of some embodiments thereof, provided merely by way of non-limitative examples, description that will be conducted making reference to the annexed drawings, wherein:

FIG. 5 schematically depicts the structure of a Robust Security Network Information Element (RSNIE) of an IEEE 802.11 Probe Response message or Beacon message;

FIG. 6 schematically depicts the structure of an IEEE 802.11 management message, particularly an Open System Authentication message, exploited in the short authentication procedure, according to an embodiment of the present invention;

FIG. 7 schematically shows in greater detail an Information Element (IE) of the IEEE 802.11 Open System Authentication message, according to an embodiment of the present invention;

FIG. 8 schematically depicts the structure of an EAP-Response Identity message, exploited in the short authentication procedure according to an embodiment of the present invention;

DETAILED DESCRIPTION OF THE PREFERRED EMBODIMENT(S) OF THE INVENTION

Figure 1:
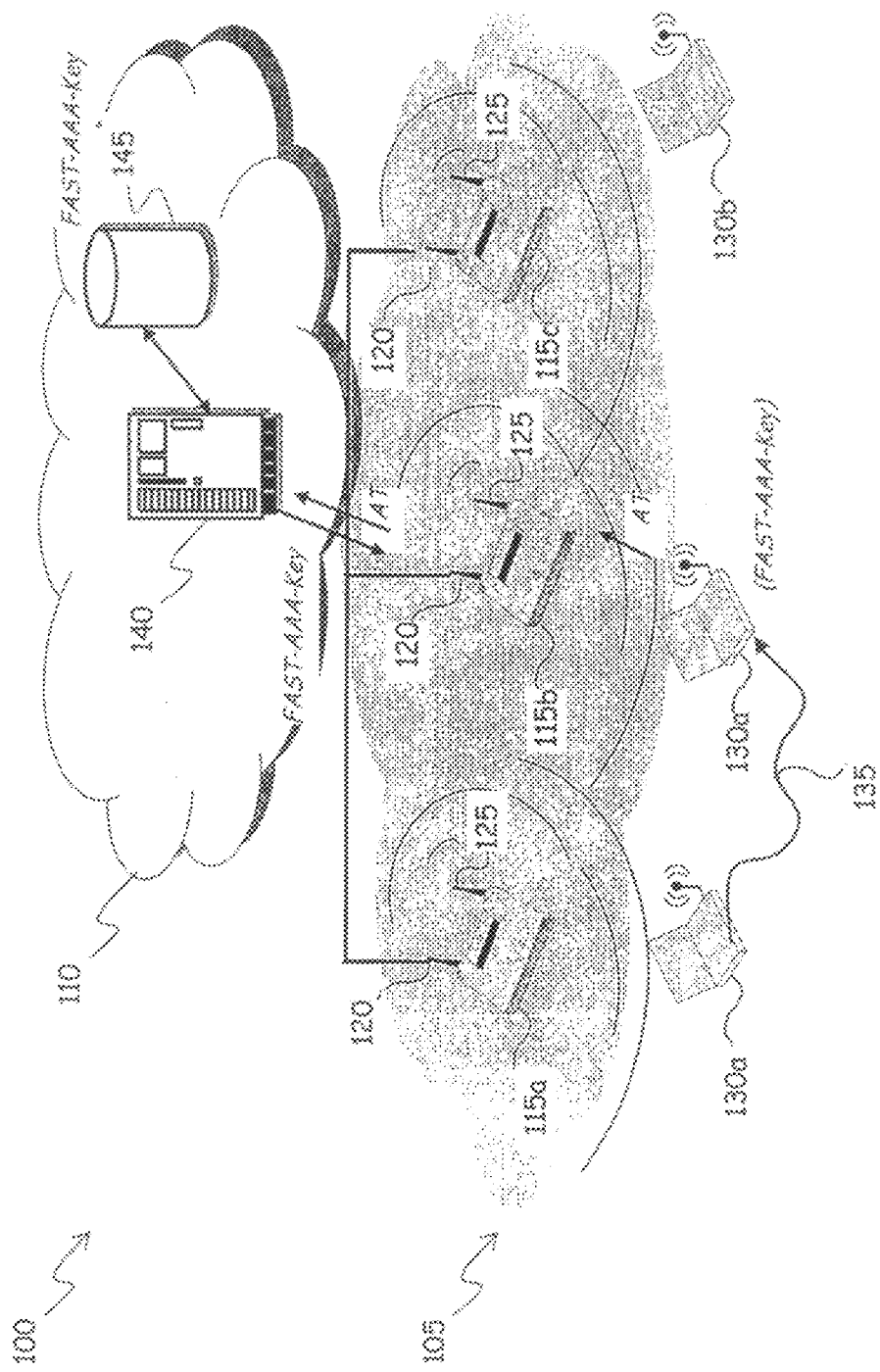
FIG. 1 schematically shows a first scenario in which a short authentication procedure according to an embodiment of the present invention is advantageously used.

Making reference to the drawings, in FIG. 1 a first scenario is schematically depicted in which a short authentication procedure according to an embodiment of the present invention, particularly for the management of handoffs, is advantageously used.

A data communications network, globally denoted by reference numeral 100, comprises a wireless network 105 according to the standard IEEE 802.11 (i.e., a Wi-Fi network or WLAN) 105, attached to an infrastructure, wired data communications network 110, including for example a wired LAN, a MAN (Metropolitan Area Network), a WAN (Wide Area Network), or a combination of two or more infrastructured networks.

The wireless network 105 provides wireless access to the infrastructured network 110. The wireless network 105 comprises a plurality of Access Points (APs), like the three APs 115a, 115b and 115c shown in the drawing.

The APs have a first, wired network interface 120, and a second, wireless (radio) network interface 125, particularly an IEEE 802.11 (WiFi) interface.

The first network interface 120, for example an Ethernet interface, is exploited for connecting the APs to each other and to the infrastructured network 110 (possibly through one or more gateways, not shown in the drawing).

The second, wireless network interface 125 is exploited for providing the wireless access to users of wireless user terminals (like portable personal computers, laptops, palmtops, PDAs, smartphones and like devices) equipped in turn with a wireless (particularly a Wi-Fi) network interface, such as the two wireless user terminals 130a and 130b shown in the drawing.

Exploiting the wireless network interface 125 of the APs, the wireless user terminals can connect to the wireless network 105 so as to communicate with each other, as well as to access the infrastructured network 110, e.g. for surfing the Internet.

Due to the fact that the APs are hardwired to the infrastructured network, the wireless access network 105 can be defined as "static".

In FIG. 1, the wireless user terminal 130b is assumed to be connected to the AP 115c, and to be not moving; the wireless user terminal 130a is instead assumed to be connected initially to the AP 115a, and to be moving, as suggested by the path denoted by reference numeral 135, so that the wireless user terminal 130a ends up being connected to the AP 115b: in the scenario of FIG. 1, such a change of AP constitutes a handoff.

The wireless network 105 is further assumed to comply with the IEEE 802.11i standard, implementing the so-called Wireless Protected Access (WPA).

As known in the art and discussed in the foregoing, the IEEE 802.11i standard exploits as a core element the IEEE 802.1X standard as far as authentication and key distribution are concerned.

The IEEE 802.1X standard provides a port-based network access control mechanism. The IEEE 802.1X relies on the EAP, a protocol that permits a wide variety of authentication mechanisms (the EAP-types).

The IEEE 802.1X standard further foresees a procedure, being part of the authentication mechanism, for dynamic derivation of keys, on a per client and per session basis.

As already mentioned, the actors of the IEEE 802.1X framework are the supplicant, the authenticator, and the authentication server.

In the scenario of FIG. 1, the role of the supplicant is played by a generic wireless user terminal, like the wireless user terminals 130a and 130b, that seeks to be authenticated by an AP, the latter acting as an authenticator, in order to use a service offered via a port on the authenticator (e.g. a MAC connectivity service). The supplicant needs to be authenticated via the authenticator to a central authentication server, denoted as 140 in FIG. 1, which is assumed to be located in the infrastructured network 110; the authentication server 140 provides to the authenticator directions about how to provide the service to the supplicant after successful authentication.

The authenticator facilitates the authentication process of the supplicant; the authenticator works in pass-through mode between the supplicant and the authentication server, implementing the logical doors control mechanism. The authenticator has two access ports to the network: a so-called "uncontrolled" port, and a so-called "controlled" port. The uncontrolled port is always open to the authentication messages transit, whereas the controlled port only becomes open after the authentication procedure succeeds: at that time, the authenticator receives from the authentication server the coding keys, per client and per session, for the next data radio communications with the supplicant.

The authentication server is an entity that provides an authentication service to an authenticator; the authentication server can for example be a RADIUS (Remote Authentication Dial-In User Service) server, a Kerberos server, a Diameter server etc., and can be a dedicated appliance (as in the exemplary case depicted in FIG. 1) or be integrated ("co-located") in an authenticator.

Once an authenticator connects to the authentications server, a secure communications channels is established therebetween, for example a ciphered and authenticated communications channel exploiting IP Security, or an SSL tunnel. Such a secure communications channel allows the secure exchange of messages between the authenticator and the authentication server relating to the authentication of a supplicant.

The EAP protocol is built around a so-called "challenge-response" communications paradigm. There are four types of messages that are exchanged by the supplicant and the authenticator for authentication purposes: EAP Request messages, EAP Response messages, EAP Success messages and EAP Failure messages. In particular, an EAP Request message is sent to the supplicant indicating a challenge, and the supplicant replies using an EAP Response message. The other two messages notify the supplicant of the authentication procedure outcome.

In order to access the wireless network 105, a generic wireless user terminal, like the wireless user terminal 130a in FIG. 1, playing the role of supplicant in this scenario, associates with an AP, like the AP 115a, which plays the role of authenticator. If for example that is the first time that the wireless user terminal 130a tries to access the wireless network (possibly the first time after a disconnection from the network), the wireless user terminal 130a has to perform a full authentication procedure compliant with the IEEE 802.11i standard at the authentication server 140, through the AP (authenticator) 115a.

For example, the wireless user terminal (supplicant) 130a sends to the AP (authenticator) 115a an IEEE 802.11 Probe Request message. The AP replies sending to the wireless user terminal an IEEE 802.11 Probe Response message, including security parameters, and creates a physical link with that wireless user terminal. Then, the wireless user terminal sends to the AP an IEEE 802.11 Open System Authentication Request message, to which the AP replies with an IEEE 802.11 Open System Authentication Response message. The wireless user terminal then sends to the AP an IEEE 802.11 Association Request message, and the AP replies sending back an IEEE 802.11 Association Response message, with the indication that the operation has been completed successfully. This procedure allows the wireless user terminal to be associated to the AP. Up to now, the "controlled" port of the AP is however still blocked, because the wireless user terminal is not yet authenticated.

The wireless user terminal then sends to the AP an EAPOL Start message, and the AP replies sending back to the wireless user terminal an EAP Request/Identity message, requesting the wireless user terminal to provide its identity; in reply to this request, the wireless user terminal provides its identity, sending to the AP an EAP Response/Identity message, that is forwarded by the AP to the authentication server 140 (encapsulated in a message formatted according to the predetermined communication protocol, e.g. the RADIUS protocol). The authentication server then performs with the wireless user terminal, through the AP, the authentication procedure based on the EAP authentication method (EAP-Type) negotiated. In case of positive authentication, the authentication server sends to the wireless user terminal (through the AP) an EAP Success message, otherwise the authentication server sends an EAP Failure message. During the authentication phase, the (authentication) traffic passes through the uncontrolled port of the AP, and the controlled port remains blocked; after the authentication, the controlled port is unblocked, and the traffic passes therethrough.

As a result of the authentication procedure, the wireless user terminal and the authentication server generate, each one at its own side, a pair of shared secrets, namely a Master Session Key (MSK), and an Extended Master Session Key (EMSK). The authentication server sends to the AP (authenticator) only the MSK, typically a 64 Bytes digital code; the MSK communicated by the authentication server to the authenticator is referred to as the "AAA-Key", where the triple A stands for Authentication, Authorization and Accounting.

The authenticator exploits the received AAA-key (or a part of it, typically the first 32 Bytes, forming the so-called Pairwise Master Key—PMK) for generating (as a result of a four-way handshake procedure with the wireless user terminal) the ciphering keys which will be thereafter used for ciphering the communications between the wireless user terminal and the AP over the radio link.

During the authentication procedure the authentication server and the wireless user terminal obtain, at their own sides and starting from the EMSK (i.e., the key that is not communicated to the authenticator) a further key, referred to as the Application-specific Master Session Key (AMSK).

The steps so far described refer to a full authentication procedure that the wireless user terminal has to perform at least the first time it connects to the wireless network.

According to an embodiment of the present invention, in order to minimize the latency experienced by a wireless user terminal during handoff authentication, a further key AMSK' is generated based on the AMSK, for example taking a portion thereof, e.g. the first 32 Bytes; such a further key AMSK' will be exploited by the authentication server and the wireless user terminal for generating an AAA-key in a faster way compared to the full authentication. In particular, the key AMSK' will be exploited for carrying out a short authentication procedure in case of handoff of the wireless user terminal, like for example in case the wireless user terminal 130a, initially associated with the AP 115a, due to its movement enters in the area of coverage of the AP 115b, as will be described in greater detail in the following.

Figure 2:
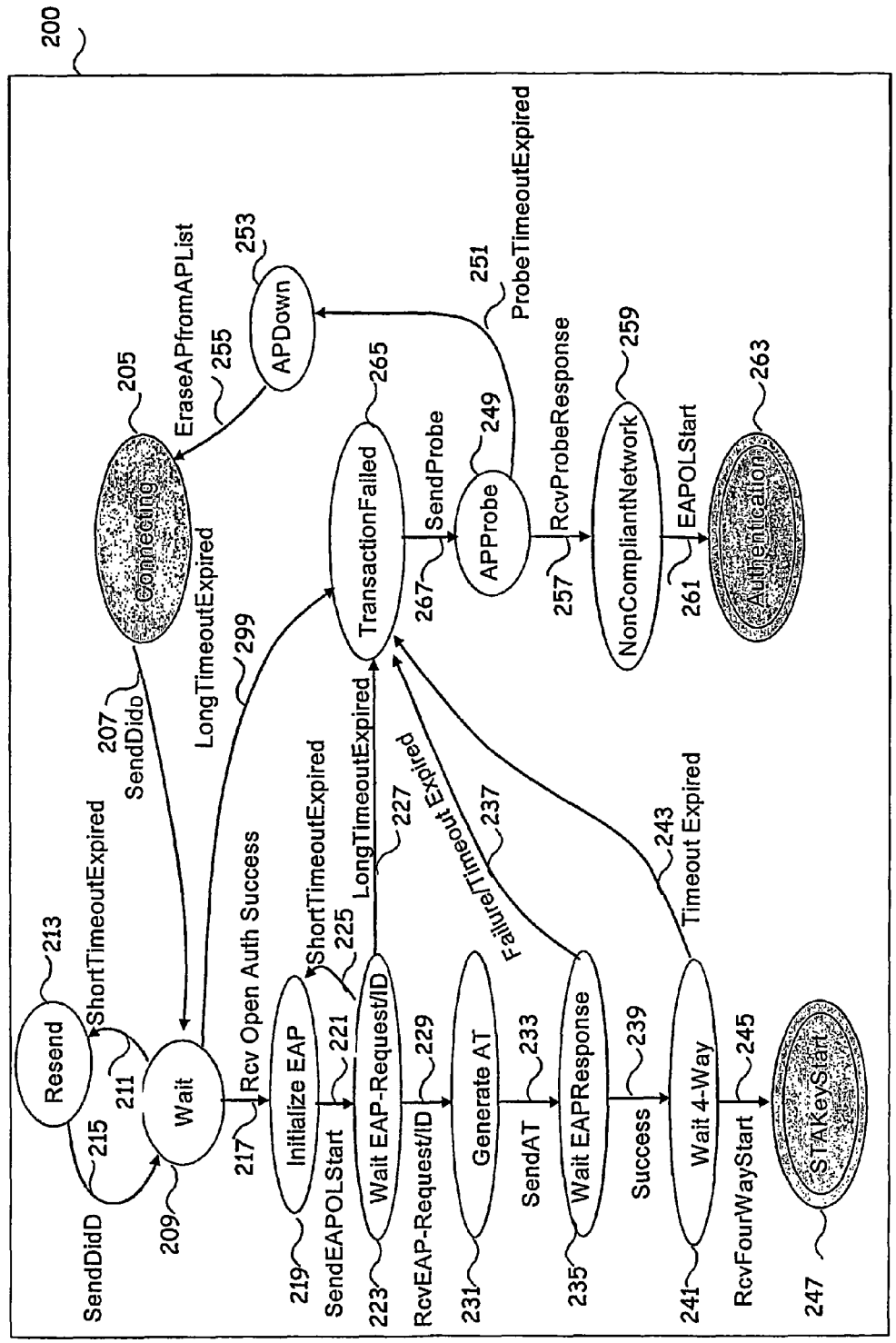
FIG. 2 schematically shows, in terms of a state-transition diagram, the operation of a supplicant in a short authentication procedure according to an embodiment of the present invention.
Figure 3:
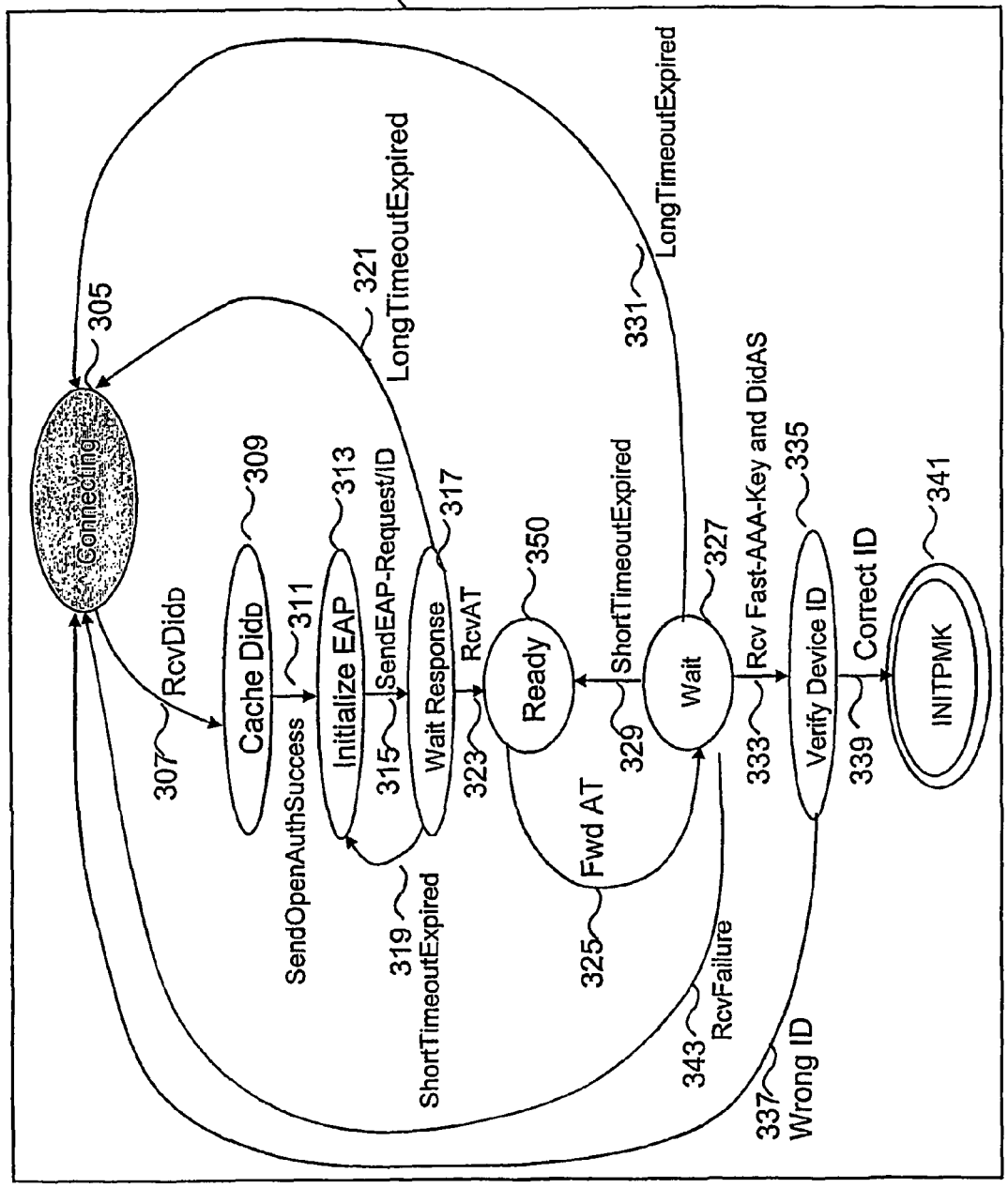
FIG. 3 schematically shows, in terms of a state-transition diagram, the operation of an authenticator in a short authentication procedure according to an embodiment of the present invention.
Figure 4:
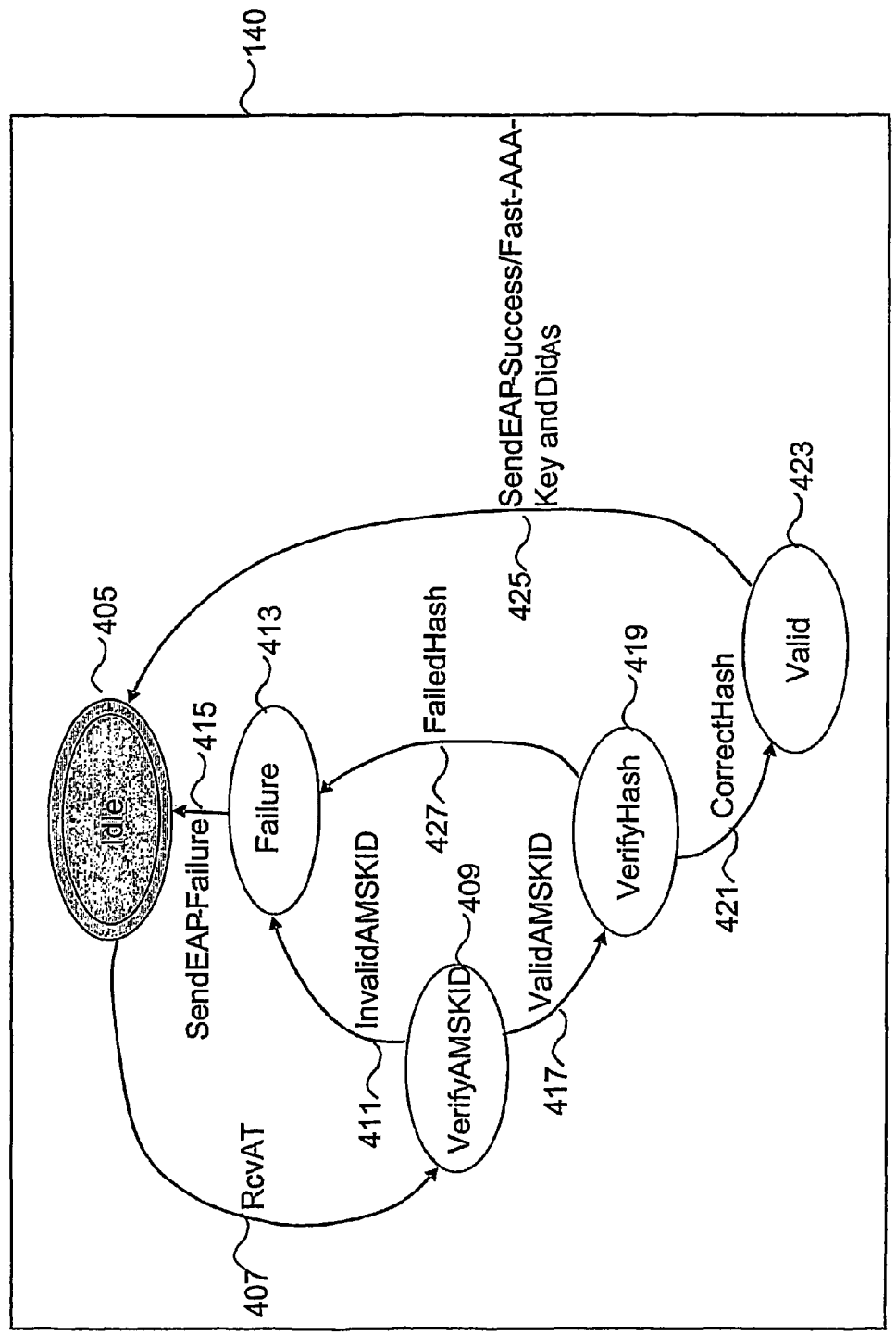
FIG. 4 schematically shows, in terms of a state-transition diagram, the operation of an authentication server in a short authentication procedure according to an embodiment of the present invention.

In FIGS. 2, 3 and 4 there is schematically shown, in terms of state-transition diagrams of the different players involved, a short authentication procedure for managing the handoff, according to an embodiment of the present invention. In particular, FIG. 2 relates to the operations performed by the generic wireless user terminal, playing the role of supplicant 200, involved in the handoff, in the example of FIG. 1 the wireless user terminal 130a; FIG. 3 relates to the actions performed by the generic AP, playing the role of authenticator 300, into whose coverage area the wireless user terminal enters, in the example of FIG. 1 the AP 115b; FIG. 4 relates to the actions performed by the authentication server 140. It is pointed out that the state-transition diagrams of FIGS. 2, 3 and 4 only take in consideration the case of an handoff, and not that of a full authentication: the latter is carried out in a per-se conventional, standard-compliant way, exception made for the generation, on both the supplicant's and the authenticator server's side, of the additional key AMSK' which, according to an embodiment of the present invention, will be exploited for the short authentication in case of handoff.

The initial state of the supplicant 200 is identified by 205 ("Connecting"); during its operation, the wireless user terminal 130a issues on a regular basis IEEE 802.11 Probe Request messages, in order to identify the presence of APs; APs like the AP 115a and the AP 115b in whose area of coverage the wireless user terminal 130a is located reply by sending thereto IEEE 802.11 Probe Response messages; based on the received IEEE 802.11 Probe Response messages, the wireless terminal 130a selects the new AP 115b as the new network's access point in substitution of the previous AP 115a. In alternative, the wireless user terminal does not need issuing IEEE 802.11 Probe Request messages, being the APs that autonomously issue Beacon messages, based on which the wireless user terminal 130a selects the new AP 115b. The wireless user terminal may operate the selection based on the measurement of the radio quality of the messages received from the APs.

In the art, the IEEE 802.11 Probe Response messages and the Beacon messages are used by the generic authenticators for indicating to the supplicants which authentication and data encryption mechanisms the authenticator supports. To this purpose, in addition to information concerning the network, the IEEE 802.11 Probe Response messages and the Beacon messages include a message element, known in the is art as Robust Security Network Information Element (RSNIE).

According to an embodiment of the present invention, the IEEE 802.11 Probe Response messages and/or the Beacon messages are advantageously exploited for informing the wireless user terminals about the fact that the generic authenticator supports the short authentication.

The structure of an RSNIE 500 is schematically depicted in FIG. 5; in that drawing, the numbers in parenthesis specify the length (in Bytes) of each field. The fields of the RSNIE 500 other than those relevant for the understanding of the invention embodiment being described will not be discussed in detail, being per-se known.

The RSNIE 500 includes a field referred to as Authentication and Key Management (AKM) suite list 505, four Bytes long, whose value indicates the capability of the authenticator of handling one among several authentication methods (e.g., authentication through Pre-Shared Key—PSK). The RSNIE 500 also includes a field referred to as RSN capabilities 510, two Bytes long, which in the art is used to describe peculiar capabilities of an authenticator, such as for example the capability of providing a pre-authentication mechanism.

According to an embodiment of the present invention, the fields of the RSNIE included in the IEEE 802.11 Probe Response messages and the Beacon messages are exploited for informing the wireless devices of the fact that a generic authenticator supports a short handoff authentication procedure.

In particular, in an embodiment of the present invention, the AKM suite list field 505 can be exploited, by defining a dedicated AKM suite selector value to be added to an already existing list of values. When the wireless user terminals reads in the AKM suite list field 505 that value, they understand that the authenticator supports the short authentication procedure and may decide to select it.

In an alternative embodiment of the present invention, the RSN capabilities field 510 is exploited; ten bits of the two Bytes of this field are in fact reserved and are currently not interpreted by a standard wireless user terminal; thus, these ten bits are available, and one of them can be exploited for providing to the wireless user terminal the desired indication that the authenticator supports the short handoff authentication.

It is observed that the use of the RSN capabilities field for informing of the support of the short authentication is a solution adapted to be used in any wireless network compliant to the IEEE 802.11i standard; on the contrary, the use of an AKM suite selector value is not suitable in general; for example, it is adapted to be used in a wireless network such as that depicted in FIG. 1, but not in the case of ad-hoc wireless networks, more generally wireless networks referred to as Independent Base Service Set (IBSS), in which the IEEE 802.11i standard does not provide for the support of more than one authentication mechanism; in that case, a single AKM suite selector value may be specified (which is the one corresponding to the full authentication method that should be performed in case of short authentication failure) since in an IBSS there is no mechanism to negotiate the AKM.

Once the wireless user terminal 130a has selected the new AP 115b, the wireless user terminal 130a, i.e. the supplicant 200 performs a so-called "Open Authentication" procedure with the AP 115b, i.e. the authenticator 300: the supplicant sends to the authenticator an IEEE 802.11 Open System Authentication Request message, including an identifier DidD of the wireless user terminal 125a (event 207, "SendDidD"), and waits for a response from the authenticator (state 209, "Wait").

According to an embodiment of the present invention, the identifier DidD is calculated in the following way:

$$DidD=H\ (Did,RANDOM,AMSK')$$

where Did is an identifier that the wireless terminal 130a has used when it performed the full authentication procedure with the authentication server 140, AMSK' is the part of the application-specific key AMSK generated by both the authentication server and the wireless user terminal during the full authentication procedure, RANDOM is a random string generated by the wireless user terminal, and H is for example a hash function. It is observed that the specific way the identifier DidD is generated is however not limitative for the present invention.

FIG. 6 schematically shows the structure of a management message 600 according to the IEEE 802.11 standard, particularly a message of the type Open System Authentication class, and more particularly an IEEE 802.11 Open System Authentication Request referred above. As for the case of FIG. 5, the numbers in parenthesis specify the length (in Bytes) of each field. The fields of the message 600 other than those relevant for the understanding of the invention embodiment being described will not be discussed in detail, being per-se known. The message 600 includes a Frame Body field 605, of length variable from 0 up to 2312 Bytes. The Frame Body field 605 may in particular include one or more Information Elements. As depicted in FIG. 7, according to an embodiment of the present invention, an Information Element 700 is exploited by the supplicant for including the identifier DidD. In particular, the Information Element 700 comprises an Element Identifier ("Element ID") field 705, identifying the Information Element 700, a length field ("Length") 710, specifying the length of the Information Element 700, and an Information field 715, wherein the identifier DidD is placed.

Preferably, in case a first, shorter timeout expires without receiving the response from the authenticator (event 211, "ShortTimeoutExpired"), the supplicant 200 re-sends the IEEE 802.11 Open System Authentication Request message, including the identifier DidD (state 213, "Resend", and event 215, "SendDidD"), and keeps on waiting (returning to the "Wait" state 209). In case a second, longer timeout expires without receiving the response (event 299, "LongTimeoutExpired"), the transaction is considered failed (the management of the failed transaction will be described later).

The authenticator 300, initially in a state 305 ("Connecting"), upon receipt of the IEEE 802.11 Open System Authentication Request message with the identifier DidD of the wireless user terminal 125a (event 307, "RcvDidD"), stores the received identifier DidD, for subsequent use (state 309, "Cache DidD"), then it replies to the supplicant 200 by sending an IEEE 802.11 Open System Authentication Response message, which is always positive, being the authentication, by definition, "open" (event 311, "SendOpenAuthSuccess").

After sending the IEEE 802.11 Open System Authentication Response message, the authenticator 300 activates and initializes the BAP (state 313, "Initialize EAP"); similarly, the supplicant 200, upon receipt of the IEEE 802.11 Open System Authentication Response message (event 217, "Rcv Open Auth Success"), activates and initializes the EAP (state 219, "Initialize EAP").

The supplicant 200 sends to the authenticator 300 an EAPOL-Start message (event 221, "SendEAPOLStart"), indicating the intention of the supplicant to start an EAP transaction. The supplicant 200 then waits for an EAP-Request/Identity message from the authenticator (state 223, "Wait EAP-Request/ID"). The supplicant keeps on waiting until a first, shorter timeout expires (event 225, "ShortTimeoutExpired"), then re-sends the EAPOL-Start message; in case a second, longer time out expires in vain (event 227, "LongTimeoutExpired"), the transaction is considered failed.

The authenticator 300 (after receipt of the EAPOL-Start message from the supplicant, an event not shown in the state-transition diagram of FIG. 3, because considered implicit for the sake of simplicity), issues the EAP-Request/Identity message (event 315, "Send EAP-Request/ID"), requesting the supplicant's identity; the authenticator then waits for a response (state 317, "Wait Response"). In case a first, shorter timeout expires during the wait (event 319, "ShortTimeoutExpired"), the authenticator re-sends the EAP-Request/Identity message; in case of expiry of a second, longer timeout (event 321, "LongTimeoutExpired"), the authenticator returns to the initial state 305.

Upon receipt of the EAP-Request/Identity message (event 229, "RcvEAP-Request/ID"), according to an embodiment of the present invention the supplicant generates an authentication token AT (state 231, "Generate AT"); for example, the authentication token AT is generated as follows:

AT=RANDOM,H(Authid,RANDOM,AMSK'),AM-
SKID where RANDOM is the random string generated and used for calculating the identifier DidD, Authid is an identifier of the authenticator 300 which is known to the supplicant 200 (the authenticator can communicate the identifier Authid to the wireless terminals, for example broadcasting it in the Beacon messages), and AMSKID is an identifier that uniquely identifies the key AMSK—from which the key AMSK' is obtained—both at the wireless user terminal and at the authentication server (for example, the identifier AMSKID is generated together with the key AMSK, based on agreed-upon criteria). It is observed that the specific way the authentication token AT is generated is however not limitative for the present invention.

The supplicant 200 sends the generated authentication token AT to the authenticator 300, including it in the EAP-Response/Identity response message (event 233, "SendAT"). Afterwards, the supplicant waits for a response from the authenticator about the outcome of the authentication (state 235, "Wait EAPResponse"). In case of expiry of a timeout, or in case of unsuccessful outcome (event 237, "Failure/Timeout Expired"), the transaction is considered failed.

FIG. 8 schematically depicts the structure of an EAP-Response/Identity message 800 according to an embodiment of the present invention; the fields making up the message will not be described in detail, being known per-se; according to an embodiment of the present invention, the supplicant puts the generated authentication token AT in a field Type-Data 805 of the message.

Upon receipt of the EAP-Response/Identity message from the supplicant (event 323, "RcvAT"), the authenticator 300 starts the short authentication procedure of the supplicant 200 at the authentication server 140 (state 350, "Ready"); this procedure is directed to obtain, from the authentication server, a valid authentication key in respect of the wireless user terminal 130a. It is underlined that the authenticator is authorized to request a valid authentication key (Fast-AAA-Key) to the authentication server only upon receipt of the authentication token AT from the supplicant.

The authenticator 300 forwards the received authentication token AT to the authentication server (event 325, "FwdAT"), then waits for response from the authentication server (state 327, "Wait"). In case a first, shorter timeout expires without receiving a response (event 329, "ShortTimeoutExpired"), the authenticator 300 re-sends the authentication token AT, and keeps on waiting; in case of expiry of a second, longer timeout (event 331, "LongTimeoutExpired"), the authenticator returns to the initial state 305.

In particular, according to an embodiment of the present invention, the authenticator 300 encapsulates the EAP-Response/Identity message including the authentication token AT received from the supplicant 200 within a message compliant to the AAA protocol used by the authenticator and the authentication server for communicating with each other, for example a RADIUS-Access Request message.

Figure 9:
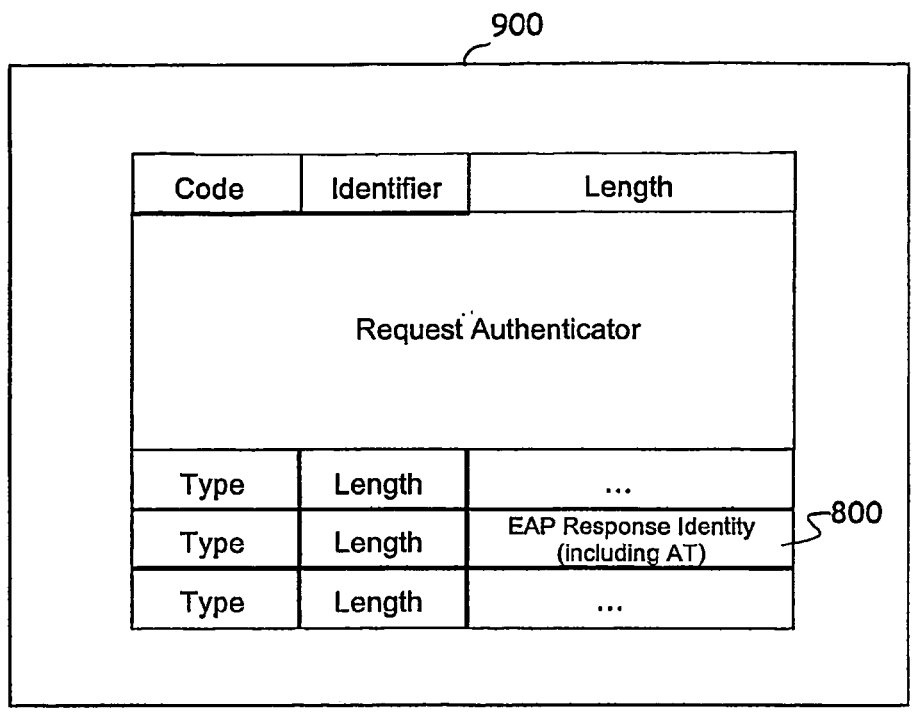
FIG. 9 schematically shows the structure of a message by which the authenticator forwards the EAP-Response Identity message to the authentication server, according to an embodiment of the present invention.

FIG. 9 schematically depicts the structure of the RADIUS-Access Request message 900 by which the authenticator forwards to the authentication server the received authentication token AT. The fields making up the message will not be described in detail, being known per-se; according to an embodiment of the present invention, the EAP-Response/Identity message 800 including the authentication token AT is encapsulated in a particular attribute defined by the standard for the transmission of the EAP messages over the RADIUS protocol.

The authentication server 140, initially in an idle state (state 405, "Idle"), receives the AAA-protocol message from the authenticator 300, encapsulating the EAP-Response/Identity message including the authentication token AT received from the supplicant 200 (event 407, "RcvAT").

The authentication server 140 verifies the validity of the identifier AMSKID of the key AMSK, which identifier is part of the authentication token AT (state 409, "VerifyAM-SKID"); to this purpose, the authentication server may check whether the received AMSKID is included in the list of identifiers held at the authentication server (schematically shown in FIG. 1 as a database 145).

If the identifier AMSKID is found to be invalid (event 411, "InvalidAMSKID"), the authentication procedure fails (state 413, "Failure"); the authentication server replies to the authenticator 300 by an EAP-Failure message (event 415, "SendEAP-Failure"), and returns to the idle state 405.

If instead the identifier AMSKID is found to be valid (event 417, "ValidAMSKID"), the authentication server retrieves the corresponding key AMSK, associated with the wireless user terminal involved in the handoff, and possibly takes the part AMSK' thereof (e.g., the first 32 Bytes), the same used by the supplicant 200 for calculating the authentication token AT.

On the authentication server side, the authenticator is identified by an identifier AS-Authid (such an identifier, similarly to the supplicant-side authenticator identifier Authid, is communicated by the authenticator to the authentication server).

Using the key AMSK' derived from the locally-held key AMSK that corresponds to the identifier AMSKID included in the received authentication token, using the authentication server-side authenticator identifier AS-Authid, and using the random string RANDOM got from the received authentication token AT, the authentication server calculates the hash value:

H(AS-Authid,RANDOM,AMSK')

where H is the same hash function used by the supplicant 200.

The authentication server checks the validity of the hash value included in the received authentication token AT (state 419, "VerfyHash") by comparing it to the locally calculated hash value.

In case the two hash values (the one received with the authentication token, the other calculated locally to the authentication server) do not coincide (event 427, "Failed Hash"), this means the authentication and/or supplicant have been compromised, the authentication procedure fails (state 413) and the authentication server sends to the authenticator the RADIUS Access-Reject message including an EAP-Failure message (event 415). The authenticator 300 receives from the authentication server the failure indication (event 343, "Rcv Failure") and forwards the EAP-Failure message to the supplicant that concludes the transaction (state 265).

In case the two hash values coincide (event 421, "CorrectHash", leading to state 423, "Valid"), the authentication server has ascertained the authenticity of the authenticator (the AP), from one side, and of the supplicant (wireless user terminal), from the other.

In fact, by checking whether the hash value included in the received authentication token AT coincides with the hash value calculated locally at the authentication server, the authentication server checks whether the authenticator to which the wireless user terminal is connected is in effect the authenticator from which the authentication server has received the authentication token AT. A compromised authenticator may in fact present itself to the wireless user terminal using an identifier Authid different from the identifier AS- Authid by which that authenticator is recognized by the authentication server: if this happens, the two hash values differ.

The authenticity of the wireless user terminal is instead ascertained through the key AMSK', which is available to the wireless user terminal only in case it has previously completed with success a full authentication operation.

The authentication server generates a fast AAA key Fast-AAA-Key for the new communications session between the wireless user terminal 130a and the new AP 115b. It is underlined that such a key is generated in a fast way, without executing a full authentication procedure. In particular, according to an embodiment of the present invention, the key Fast-AAA-key is generated as follows:

$$Fast\text{-}AAA\text{-}key=H(Did,AS\text{-}Authid,RANDOM, AMSK');$$

in this way, the values of the key Fast-AAA-key is related to the identifier AS-Authid of the authenticator to which the key will be sent by the authentication server and to the identity Did of the wireless user terminal.

The authentication server also calculates a wireless user terminal identifier DidAS, for example in the following way:

$$DidAS=H(Did,RANDOM,AMSK')$$

wherein, as mentioned in the foregoing, the identifier Did is the identity of the wireless user terminal, which the wireless user terminal itself communicated to the authentication server during the full authentication procedure. It is observed that the authentication server does not send the identifier Did in plaintext, but it uses the hash function H so as to avoid that the authenticator gets knowledge of the real wireless user terminal identity Did (thereby possibly exposing it to attacks). The random string RANDOM used for calculating the identifier DidAS, the same transmitted by the wireless user terminal, ensures that the generated identifier DidAS changes from session to session: thus, even if the authenticator is compromised, the identifier DidAS cannot be re-used for a subsequent short authentication procedure. Moreover, even if an attacker intercepted the wireless user terminal identity Did, which can be transmitted in clear during the full authentication procedure, and possibly even the random string RANDOM, such an attacker will not be in condition to derive the identity DidAS, because he/she does not know the key AMSK', being the latter only known to the wireless user terminal and to the authentication server, and never traveling.

The authentication server sends to the authenticator an EAP-Success message, encapsulated in the RADIUS Access-Accept message, together with the generated key Fast-AAA-key and the identifier DidAS of the wireless user terminal (event 425, "SendEAPSuccess/Fast-AAA-Key and DidAS"). In particular, according to an embodiment of the present invention, the key Fast-AAA-key and the identity DidAS are sent as:

$$\{Fast\text{-}AAA\text{-}Key,DidAS\}RADIUSKEY$$

where by { } RADIUSKEY there is meant that the argument within the parentheses is encrypted with the secret key RADIUSKEY shared by the authentication server and the authenticator.

Figure 10:
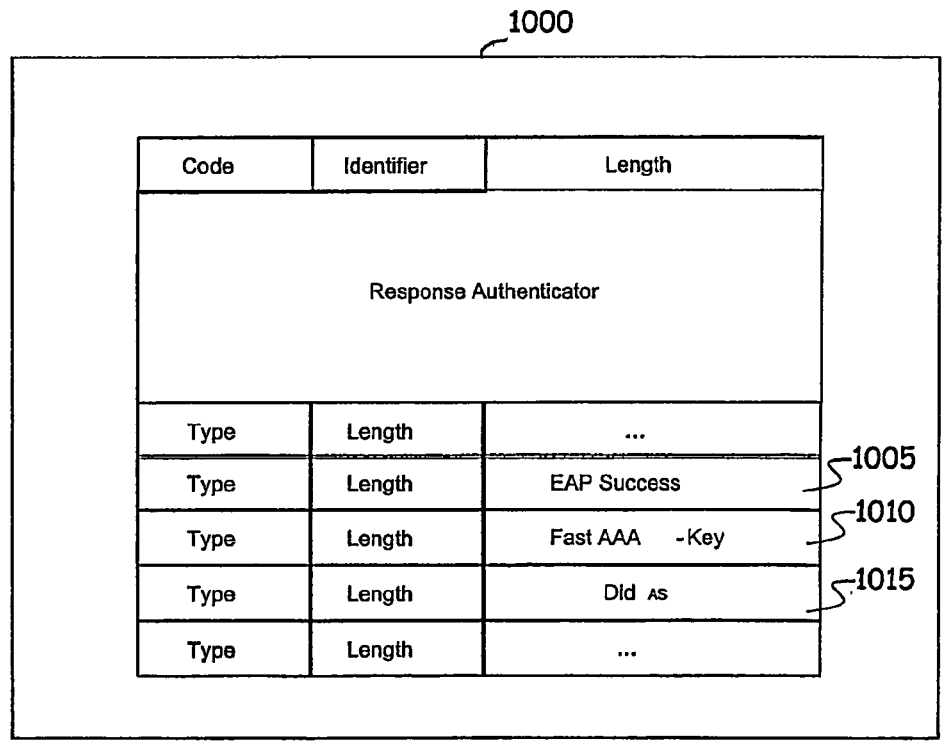
FIG. 10 schematically shows the structure of a message sent by the authentication server to the authenticator in case the authentication is successful.

FIG. 10 schematically depicts, just by way of example, the structure of a RADIUS-Access Accept message 1000 (the fields making up the message will not be described in detail, being known per-se) by which the authentication server sends to the authenticator the EAP-Success message, encapsulated as an attribute 1005 of the RADIUS-Access Accept message 1000. The RADIUS-Access Accept message 1000 also encapsulates two further attributes 1010 and 1015, the former corresponding to the generated key Fast-AAA-Key, the latter to the calculated identifier DidAS.

The authenticator 300 receives from the authentication server the RADIUS Access-Accept message including the key Fast-AAA-key, the identifier DidAS of the wireless user terminal (event 333, "Rcv Fast-AAA-Key and DidAS") and the EAP-Success message. This is forwarded by the authenticator 300 to the supplicant. Upon receipt of the EAP Success message (event 239, "Success"), indicating the successful result of the authentication procedure, the supplicant waits for the start of the four-way handshake procedure (state 241, "Wait 4-Way").

The authenticator 300 can now authenticate the wireless user terminal associated therewith; to this purpose, the authenticator checks whether the identifier DidD that the wireless user terminal has communicated to the authenticator coincides with the identifier DidAS received from the authentication server (state 335, "Verify Device ID").

If the two wireless user terminal identifiers differ (event 337, "Wrong ID"), the short authentication procedure terminates (the authenticator returns to the initial state 305) The supplicant does not receive a notification of the start of the four-way handshake and when the timeout expires the transaction is considered failed (event 243, "Timeout expired").

If DidD=DidAS (event 339, "Correct ID"), the authenticator starts the four-way handshake procedure (state 341, "INITPMK").

When the supplicant receives from the authenticator the EAPOL-Key message indicating the start of the four-way handshake procedure (event 245, "RcvFourWayStart"), the supplicant starts the four-way handshake procedure (state 247, "STAKeyStart").

The supplicant has all the pieces of information necessary for generating the new session key Fast-AAA-Key to be used for the new session; the key Fast-AAA-Key is in particular calculated as:

$$Fast\text{-}AAA\text{-}Key=H(Did,Authid,RANDOM,AMSK').$$

It is observed that the supplicant uses, for calculating the key Fast-AAA-Key, the authenticator identifier Authid which is known thereto, whereas the authentication server used the other, authentication server-side authenticator AS-Authid: the resulting key Fast-AAA-Key coincides with that calculated by the authentication server only provided that the authenticator has not been compromised (so that the identity it presents to the authentication server is different from the one it presents to the wireless devices).

At the end of the four-way handshake procedure, the authenticator and the supplicant, each one at its own side, generate a ciphering key to be used for ciphering the communications over the radio link; if the authenticator has been compromised, so that the key Fast-AAA-Key available at the authenticator differs from the key Fast-AAA-Key calculated by the supplicant, the ciphering key generated by the supplicant is different from that generated by the authenticator, and the communications over the radio link will not be possible. Thus, the supplicant authenticates the authenticator.

Preferably, the database 145 managed by the authentication server 140 stores all the keys Fast-AAA-Key generated in respect of a given wireless device, associated with the respective key AMSK (or the part thereof AMSK') from which the keys Fast-AAA-Key are generated. The authentication server, each time a new key Fast-AAA-Key is generated, checks whether the newly generated key coincides with a key in the database already generated in the past. In this way, in case an authentication token AT is received from a wireless device coincident with an authentication token already received in the past, leading to the generation of a key Fast-AAA-Key coinciding with one already generated, the authentication server takes this as a signal that an attack is possibly going on (e.g., a so-called "replay" attack).

In case of failure of the transaction (state 265, "TransactionFailed"), the supplicant sends to the authenticator an IEEE 802.11 Probe Request message (event 267, "SendProbe"), and waits for an IEEE 802.11 Probe Response from the authenticator (state 249, "APProbe"). In case a timeout expires without receiving any response from the authenticator (event 251, "ProbeTimeoutExpired"), the supplicant decrees that the AP is no more reachable (state 253, "APDown"), that AP is deleted from the list of the known APs (event 255, "EraseAPfromAPListI), and the supplicant returns to the initial state 205. If instead an IEEE 802.11 Probe Response from the authenticator is received within the timeout (event 257, "RcvProbeResponse"), for example indicating that the AP does not support the short authentication, or that other problems exist, the supplicant declares the network "non-compliant" with the short authentication procedure (state 259, "NonCompliantNetwork"), and the supplicant starts a fall authentication procedure, by sending to the AP the first EAPOL Start message (event 261, "EAPOLStart"). The full authentication starts (state 263, "Authentication").

It is observed that at least some of the timeout expiry events described in the foregoing might be replaced by notifications concerning the failure of some condition (for example, the invalidity of the identifier AMSKID decreed by the authentication server, and/or the incorrect hash value).

Figure 11:
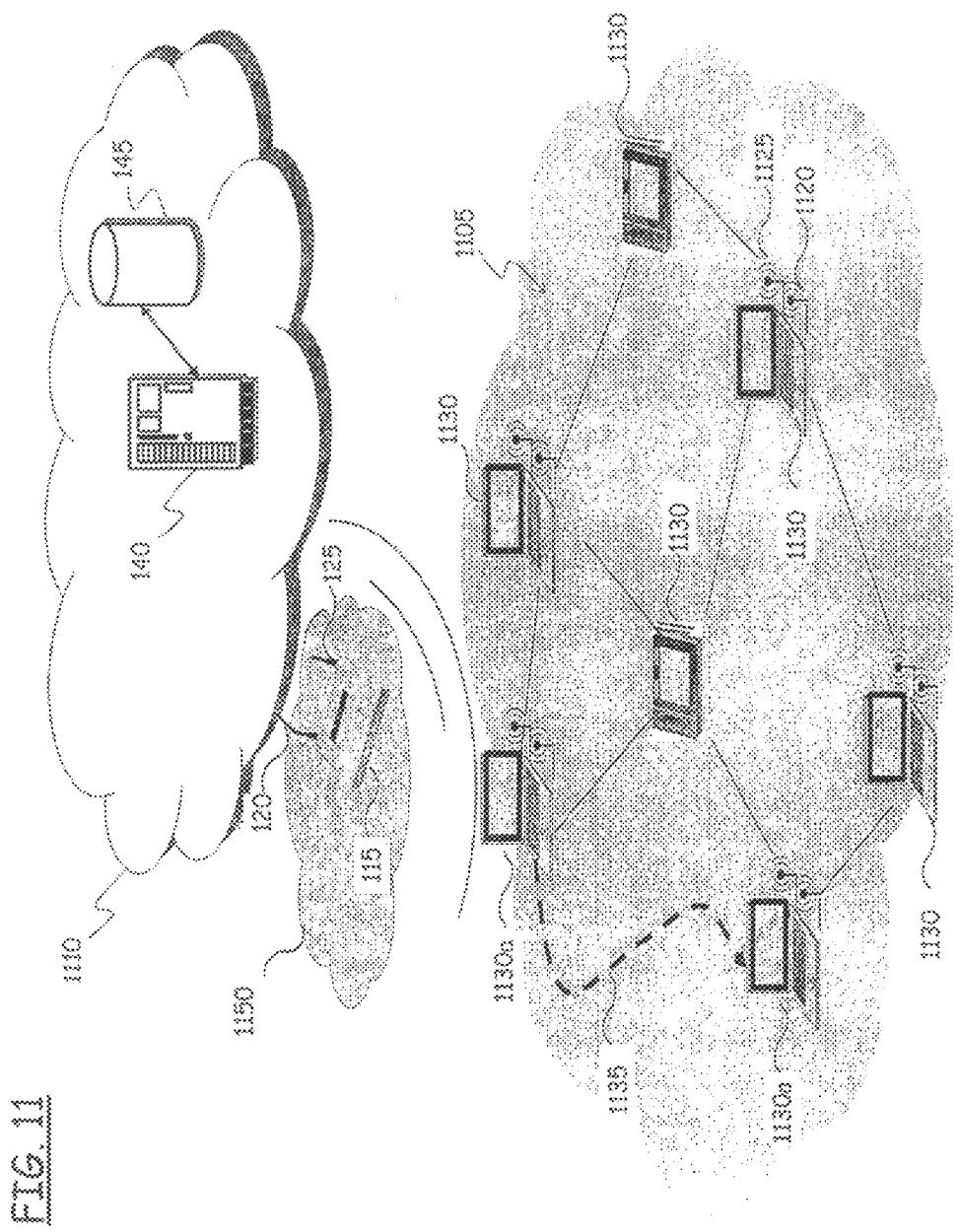
FIG. 11 schematically shows a second scenario in which a short authentication procedure according to an embodiment of the present invention may be advantageously used.

FIG. 11 depicts, schematically as in FIG. 1, another possible scenario in which the present invention can be applied. In particular, this scenario relates to a so-called ad-hoc network, which is a wireless network that does not require any fixed infrastructure. In this type of network, also referred to as Mobile Ad-Hoc NETwork (MANET), the generic wireless user terminal 1130 also acts as a router in respect of neighboring wireless user terminals, so as to allow the routing of messages from the originators to the intended destinations (usually, in a multi-hop fashion, due to the relatively limited range of radio coverage of the generic wireless user terminal). Also, due to the nomadic nature of the wireless user terminals, a generic wireless user terminal, like the terminal 1130*a* in the drawing, during its movement (along a path 1135) typically faces a change of neighboring wireless user terminals.

In such a network, the generic wireless user terminal thus plays a double role of supplicant and authenticator.

Some of the wireless user terminals 1130 may be multi-mode wireless devices, i.e. provided with one wireless interface 1125 for the communications with the other wireless user terminals, and one wireless interface 1120 for the access to a network 1150 which in turn, through an access point 115 provided with interfaces wireless 125 and wired 120, is connected to an external, infrastructured network 1110, like the Internet or a 3$^{rd}$ generation mobile telephony network.

In such a scenario, the short handoff authentication procedure previously described is also useful for managing those cases in which the previously existing connections between the wireless user terminals 1130 need to be reconfigured due to the changes determined by the movement of the wireless user terminals; in such a case, the routing of messages needs to take into account the changed network configuration and should react to such changes as fast as possible, in order to let the generic wireless user terminal know, at each instant, which is the closest neighboring wireless user terminal to be used as a next hop for the message. The short authentication procedure described in the foregoing may be applied by two neighboring wireless user terminals to set up in a short time a security connection.

Thus, thanks to an embodiment of the present invention, it is possible to guarantee that a secure communications channel between the wireless user terminals is maintained even in presence of changes of the network topology due to the movement of the wireless user terminals. The network is thus rendered self-configuring and self-healing, as far as security aspects are concerned, both against external attacks, and against attacks coming from the wireless user terminals: in fact, the generic wireless user terminal, when acting as an authenticator, cannot ask to the authentication server a valid authentication key unless it has preliminary received, from another wireless user terminal playing the role of supplicant, a valid authentication token. Furthermore, in the authentication token sent by the supplicant to the authenticator, and forwarded to the authentication server, there is the identifier of the authenticator, so the authentication server can check whether the authenticator wireless user terminal from which the authentication token has been received coincides with that specified in the authentication token or it is an attacker.

Figure 12:
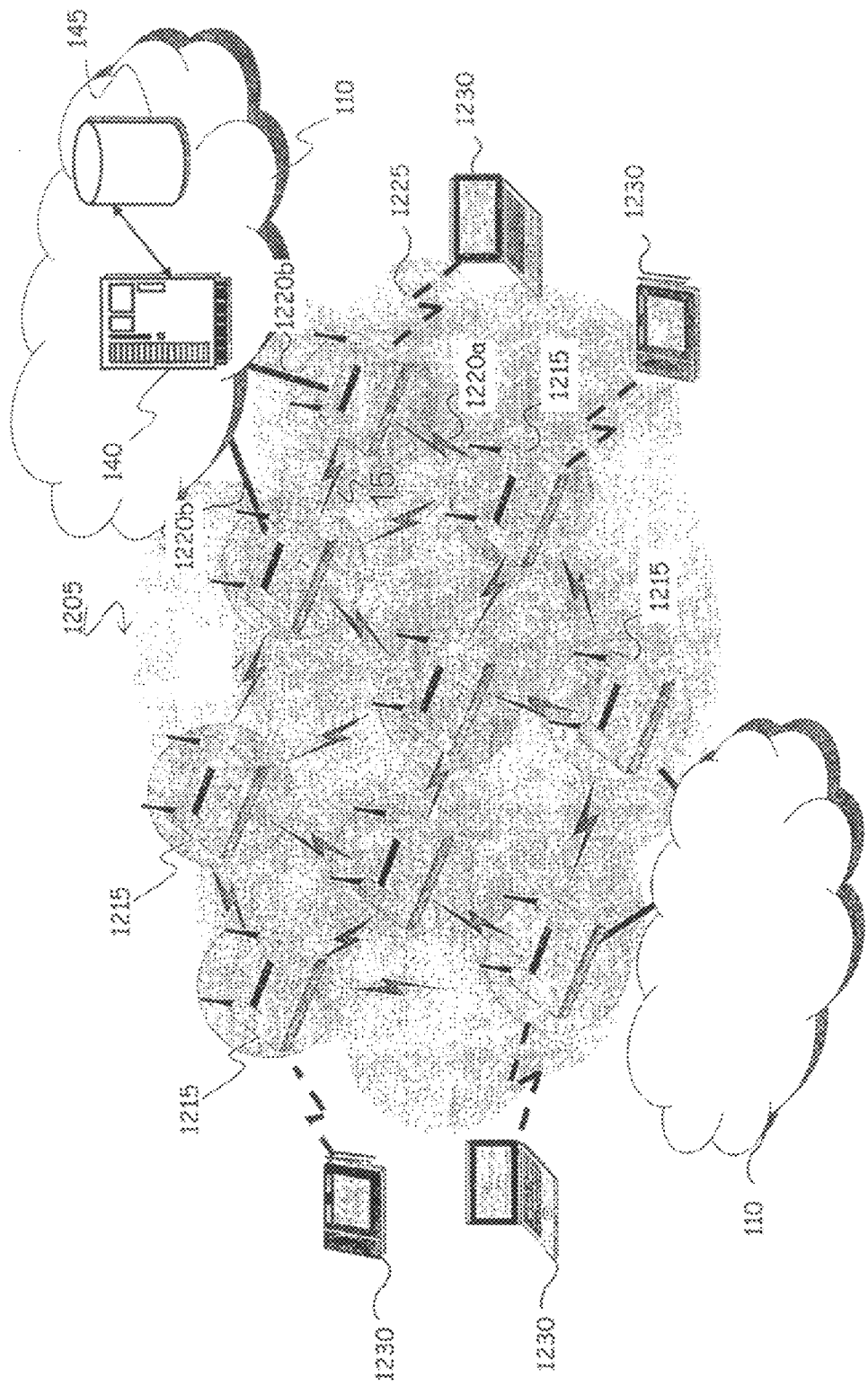
FIG. 12 schematically shows a third scenario in which a short authentication procedure according to an embodiment of the present invention may be advantageously used.

Still another scenario in which the present invention is applicable is depicted in FIG. 12. Differently from the scenario of FIG. 1, wherein the wireless access network 105 was formed by access points hardwired to the infrastructured network 115, in the case of FIG. 12 the wireless access network 1205 has an ad-hoc structure, being a network of wireless access points devices 1215; the wireless access point devices 1215 are equipped with a double interface: a first wireless interface 1220*a* used for connecting to other wireless access point devices 1215, thereby forming a mesh of wireless access point devices constituting a wireless backbone, and a second wireless interface 1225 for allowing wireless user terminals 1230 to connect to the wireless network. At least some of the wireless access point devices are equipped with a further interface 1220*b*, by means of which there is realized a hardwired connection with the infrastructured network 110.

In this network typology, not only the users' wireless user terminals, but also the access points (at least some of them) are not hardwired; also, the wireless access point devices alternatively play the role of supplicants and authenticators in respect of other wireless access point devices.

In this context, the short authentication method according to the present invention allows automatically configuring, by sending an authentication token, the cryptographic key(s) necessary for communicating in a secure way with the neighboring wireless access point devices, avoiding to carry on, in respect of each of them the full authentication procedure.

The network typology of FIG. 12 has the advantage that the deployment thereof is rather simple, especially compared to the deployment of a conventional Wi-Fi network, having an infrastructured wireless access, like in the case of FIG. 1. This reduces the costs for setting up such a network.

In addition, the possibility of having redundant communication links (a generic wireless access point device is typically connected at the same time to several other wireless access point devices) makes the network more robust: in case one of the links goes down, it is possible to redirect the traffic over a different link. In this case, the short authentication procedure according to the present invention simplifies the operations: a new wireless access point device needs perform the full authentication only once, in respect of a generic wireless access point device within the reach thereof; in order to authenticate to other wireless access points devices, the short authentication procedure is sufficient. By the short authentication, a plurality of fast authentication keys is generated, each one to be used in the communications between the generic pair of wireless access point devices. Also, in case the link between two generic wireless access point devices falls, the device remaining isolated may simply perform a short authentication with a backup device, so as to set up a new connection.

Thus, according to the present invention, a short authentication method is provided, that allows for a fast, but nevertheless secure authentication procedure of supplicants for conditionally grant thereto access to the wireless communications network.

In particular, in the invention embodiment described hereinbefore, the fast authentication procedure also takes into account the key binding problem, that is how to bind the authentication key to the authenticator (i.e. access point) identifier and supplicant (i.e., wireless user terminal) identity. The proposed solution allows the authenticator to verify that the associated supplicant is the same for which it has received, from the authentication server, an authentication key. At the same time, the proposed solution allows the supplicant to validate that the authenticator to which is associated, is the same the authentication server has sent the authentication key.

Although the present invention has been disclosed and described by way of some embodiments, it is apparent to those skilled in the art that several modifications to the described embodiments, as well as other embodiments of the present invention are possible without departing from the scope thereof as defined in the appended claims.

In particular, it is pointed out that although in the foregoing the short authentication procedure has been described making reference to the management of a handoff (i.e., a situation in which a generic supplicant, e.g. a wireless user terminal, has already been authenticated by performing a full secure authentication), this is not to be construed as a limitation: more generally, the short handoff procedure according to the present invention may be used as well as the first time the supplicant connects to the network, in alternative to the longer, full authentication referred to above. In particular, according to an embodiment of the present invention, a shorter authentication mechanism may be used to authenticate a supplicant, in alternative to the full IEEE 802.11i authentication, provided that the supplicant and the authentication server share a secret, e.g. a code, a password, and the like, for example provided to the supplicant during a subscription phase to the wireless communications network. For example, a method as described in the foregoing, exploiting a dedicated AKM suite selector or one or more available bits in the RSN capabilities field may be used for having the authenticators inform the supplicants of this further possible authentication mechanism.

The invention claimed is:

1. In a wireless communications network comprising at least one authenticator and at least one authentication server, wherein the authenticator interacts with the authentication server for authenticating supplicants in order to conditionally grant thereto access to the wireless communications network, a short authentication method for authenticating a supplicant, comprising:
providing a shared secret, shared by and available at the supplicant and the authentication server;
having the supplicant provide to the authenticator an authentication token, wherein said authentication token is based on said shared secret available thereat and comprises a first hash function having a first hash function argument comprising said shared secret;
having the authenticator forward the authentication token to the authentication server;
having the authentication server ascertain an authenticity of the received authentication token based on said shared secret available thereat comprising having the authentication server apply said first hash function to an argument comprising the retrieved shared secret, a random value, and a second identifier of the authenticator, communicated by the authenticator to the authentication server;
in case the authenticity of the authentication token is ascertained, having the authentication server generate a first authentication key based on said shared secret available thereat, and provide the generated authentication key to the authenticator, wherein said first authentication key is generated by applying a second hash function to an argument comprising the retrieved shared secret, the random value and the second identifier of the authenticator;
having the supplicant generate a second authentication key based on said shared secret; and
having the supplicant and the authenticator exploit a generated first and second keys for communicating with each other.

2. The method according to claim 1, wherein the authenticator interacts with the authentication server for authenticating the supplicants based on a secure authentication procedure, wherein said secret information is based on information generated by the supplicant and the authentication server during said secure authentication procedure.

3. The method according to claim 2, wherein said authentication token comprises an identifier of the shared secret, the authentication server exploiting the identifier of the shared secret information to retrieve the shared secret available thereat.

4. The method according to claim 1, wherein said first hash function argument comprises a first identifier of the authenticator, communicated by the authenticator to the supplicant.

5. The method according to claim 1, wherein said second authentication key is generated by applying the second hash function to an argument comprising the shared secret, the random value and the first identifier of the authenticator.

6. The method according to claim 2, further comprising:
having the supplicant provide to the authenticator a first supplicant identifier, wherein said first supplicant identifier is based on a supplicant identity and the shared secret;
having the authentication server generate and provide to the authenticator a second supplicant identifier, wherein said second supplicant identifier is based on said shared secret and on said supplicant identity, the supplicant identity being communicated by the supplicant to the authentication server during the secure authentication procedure; and
having the authenticator authenticate the supplicant based on an ascertained correspondence of the first supplicant identifier with the second supplicant identifier.

7. The method according to claim 6, wherein said first supplicant identifier is generated by the supplicant by applying a hash function to an argument comprising said supplicant identity and said shared secret.

8. The method according to claim 7, wherein said second supplicant identifier is calculated by the authentication server by applying the hash function to an argument comprising said supplicant identity and said shared secret.

9. A wireless communications network comprising:
at least one authentication server;
at least one authenticator;

at least one supplicant, wherein the authenticator interacts with the authentication server for authenticating the supplicant in order to conditionally grant thereto access to the wireless communications network;

a shared secret, shared by and available at the supplicant and the authentication server;

wherein:

the supplicant provides to the authenticator an authentication token based on said shared secret, wherein said authentication token comprises a first hash function having a first hash function argument comprising said shared secret;

the authenticator forwards the authentication token to the authentication server;

the authentication server ascertains authenticity of the received authentication token based on said shared secret available thereat comprising applying said first hash function to an argument comprising the retrieved shared secret, a random value, and a second identifier of the authenticator, communicated by the authenticator to the authentication server, and, in case the authenticity of the authentication token is ascertained, generates a first authentication key based on said shared secret available thereat, and provides the generated authentication key to the authenticator, wherein the first authentication key is generated by applying a second hash function to an argument comprising the retrieved shared secret, the random value and the second identifier of the authenticator;

and wherein:

the supplicant generates a second authentication key based on said shared secret; and the authenticator and the supplicant exploit a generated first and second authentication keys for communicating with each other.

10. The wireless communications network according to claim 9, wherein the authenticator interacts with the authentication server for authenticating the supplicants based on a secure authentication procedure, wherein said secret information is based on information generated by the supplicant and the authentication server during said secure authentication procedure.

11. The wireless communications network according to claim 10, wherein said authentication token comprises an identifier of the shared secret, and wherein the authentication server exploits the identifier of the shared secret information to retrieve the shared secret available thereat.

12. The wireless communications network according to claim 9, wherein said first hash function argument comprises a first identifier of the authenticator communicated by the authenticator to the supplicant.

13. The wireless communications network according to claim 9, wherein the second authentication key is generated by applying the second hash function to an argument comprising the shared secret, the random value and the first identifier of the authenticator.

14. The wireless communications network according to claim 10, wherein:

the supplicant provides to the authenticator a first supplicant identifier, wherein said first supplicant identifier is based on a supplicant identity and the shared secret:

the authentication server generates and provides to the authenticator a second supplicant identifier, wherein said second supplicant identifier is based on said shared secret and on said supplicant identity, the supplicant identity being communicated by the supplicant to the authentication server during the secure authentication procedure; and the authenticator authenticates the supplicant based on an ascertained correspondence of the first supplicant identifier with the second supplicant identifier.

15. The wireless communications network according to claim 14, wherein said first supplicant identifier is generated by the supplicant by applying a hash function to an argument comprising said supplicant identity and said shared secret.

16. The wireless communications network according to claim 14, wherein said second supplicant identifier is calculated by the authentication server by applying the hash function to an argument comprising said supplicant identity and said shared secret.

17. The wireless communications network according to claim 9, wherein said at least one authenticator is in hardwired communications relationship with the authentication server.

18. The wireless communications network according to claim 9, wherein the wireless communications network comprises a mobile ad-hoc network.

19. The wireless communications network according to claim 9, wherein the at least one authenticator comprises at least a first and a second authenticators, the first being in hardwired communications relationship with the authentication server and the second being in wireless connection with the first.

* * * * *